(12) United States Patent
Aumard et al.

(10) Patent No.: US 6,373,002 B1
(45) Date of Patent: Apr. 16, 2002

(54) DAMPER FOR A WEIGHING DEVICE AND A WEIGHING DEVICE PROVIDED WITH A DAMPER

(75) Inventors: Jean-Pierre Aumard, Etrembieres; Jean-Claude Navarro, Ville-La-Grand, both of (FR)

(73) Assignee: S.C.A.I.M.E.S.A., Annemasse (FR)

( * ) Notice: Subject to any disclaimer, the term of this patent is extended or adjusted under 35 U.S.C. 154(b) by 0 days.

(21) Appl. No.: 09/603,924

(22) Filed: Jun. 27, 2000

(30) Foreign Application Priority Data

Jul. 2, 1999 (CH) .............................................. 1221/99

(51) Int. Cl.[7] ........................ G01G 21/10; G01G 23/06; F16F 9/00
(52) U.S. Cl. ................. 177/184; 177/187; 188/322.19; 188/322.22; 188/322.5; 188/298
(58) Field of Search ................................ 177/184, 187, 177/188, 189; 188/282, 283, 288, 298, 322.19, 322.22, 322.5

(56) References Cited

U.S. PATENT DOCUMENTS

| | | | | |
|---|---|---|---|---|
| 3,876,017 A | * | 4/1975 | Ziefle ........................ 177/184 |
| 3,985,190 A | * | 10/1976 | Kammerer et al. ......... 177/184 |
| 3,991,841 A | * | 11/1976 | Crawley .................... 177/184 |
| 4,184,555 A | * | 1/1980 | Maltby et al. .............. 177/189 |
| 4,848,495 A | * | 7/1989 | Hayashi ..................... 177/187 |
| 5,141,064 A | * | 8/1992 | Willemsen et al. ......... 177/184 |
| 5,232,061 A | * | 8/1993 | Neeleman ................... 177/184 |
| 5,232,062 A | | 8/1993 | Neuman ..................... 177/187 |
| 5,880,410 A | * | 3/1999 | Neuman ..................... 177/187 |

FOREIGN PATENT DOCUMENTS

EP 0309144 A2 3/1989

* cited by examiner

*Primary Examiner*—Randy W. Gibson
(74) *Attorney, Agent, or Firm*—Young & Thompson

(57) ABSTRACT

A damper for a weighing device including a cavity 4 in which a plate 12 can move, which plate is designed for being connected to a weight measuring device 2. The cavity 4 is closed tightly by a flexible membrane 14 and is partly filled with an oil, while leaving a volume of air or of a gas between the top 14a of the oil and the membrane 14, the plate 12 being totally immersed in the oil. The lower surface of the plate 12 and the bottom of the cavity 4 have shapes which are not planar and which are not parallel to each other, thus preventing the formation of a thin film of oil between them. The peripheral surface of the plate 12 and of the peripheral wall of the cavity 4 define therebetween a first constriction 15 of which the transverse section is constant whatever the position of the plate 12 in the cavity 4. The peripheral area 5 of the bottom of the cavity 4 and the peripheral area 12b of the lower surface of the plate 12 facing the bottom of the cavity 4, define together a second constriction 16 of which the transverse section varies depending on the position of the plate 12 inside the cavity 4.

8 Claims, 2 Drawing Sheets

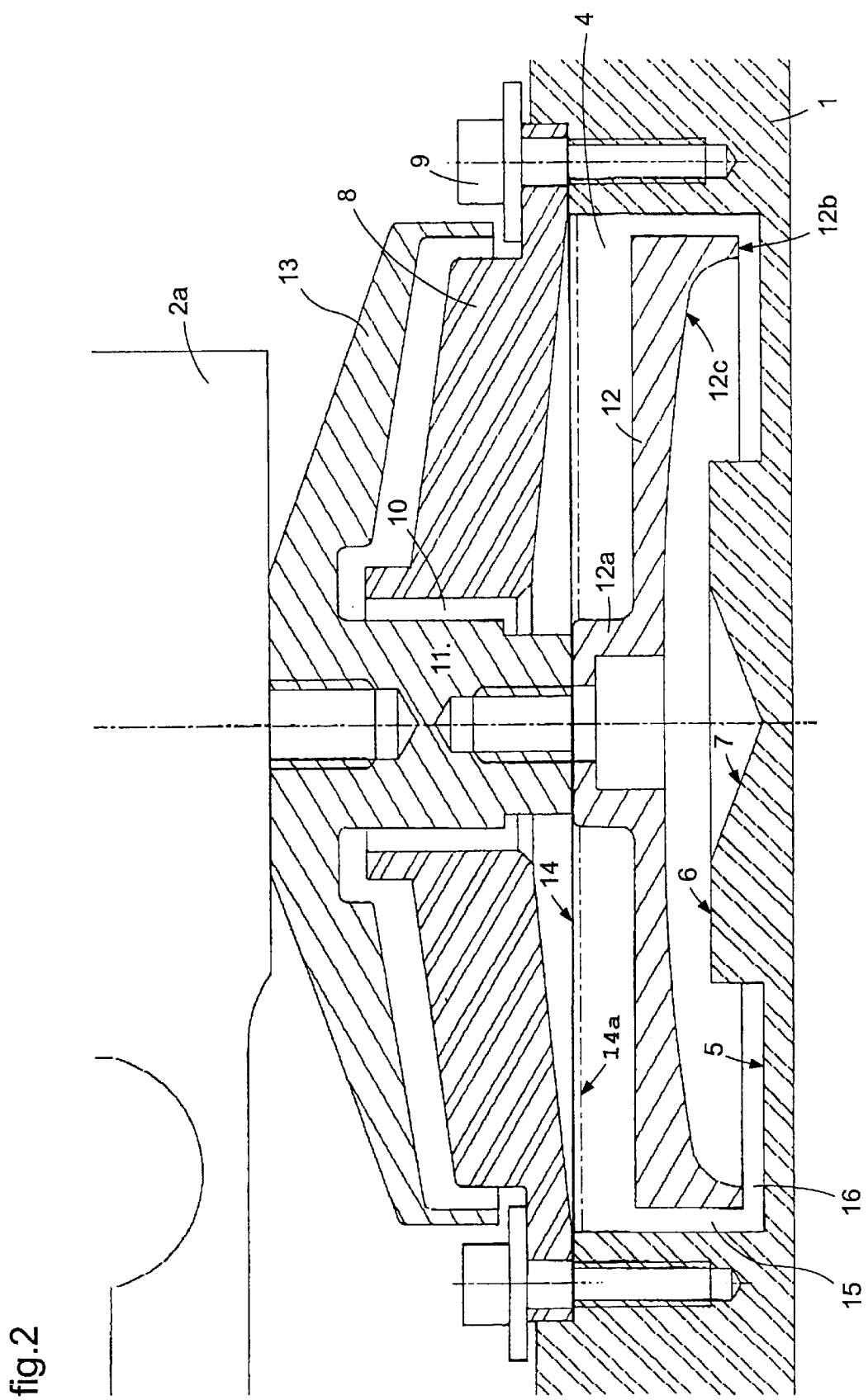

DAMPER FOR A WEIGHING DEVICE AND A WEIGHING DEVICE PROVIDED WITH A DAMPER

In applications requiring that numerous items be weighed, it is important to reduce the measurement time for each item. To this end, weighing devices have been equipped with dampers which make it possible, at each weighing operation, to reduce the time needed for reaching equilibrium after a load has been placed on the weighing device.

The present invention is aimed at such a damper as well as at a weighing device provided with a damper. Different types of dampers are known for weighing devices such as, for example, those described in document EP 0309144 and in document U.S. Pat. No. 5,232,062.

A first type of damper for a weighing device is described with reference to FIG. 10 of EP 0309144 and is comprised of a container open upwards and filled with a liquid in which is immersed a plunger affixed to the measuring body. When the plunger oscillates, its displacements are damped by the passage of liquid through an annular constriction between the plunger and the container. Such dampers have the drawback that the container filled with a liquid is open and therefore, when transporting the weighing device the liquid must be removed or the container must be tightly closed. Owing to the fact that the container is open, dust or other contaminants can penetrate therein and modify the characteristics of the liquid, in particular its viscosity.

Furthermore, depending on the weight of the item being weighed, the rod of the plunger penetrates more or less deeply into the liquid, which modifies the upward pressure exerted upon the plunger and is hence detrimental to the accuracy of the measurement. The same holds true for the forces which are associated with the surface tension of the liquid and which cause the liquid to creep up along the walls of the container and along the rod of the plunger.

The same document EP 0309144 describes a second type of damper including two tight chambers filled with a liquid and connected via a constriction. When the weighing rod oscillates, the liquid passes alternately from one container into the other via the constriction, thus damping the oscillations of the measuring member. Such dampers are complex and bulky owing to the use of two sealed chambers. Furthermore, these chambers are completely filled with liquid and the accuracy of the measurement is influenced by changes in the barometric pressure.

Furthermore, the two types of dampers described above have a damping force which is constant, whatever may be the amplitude of the oscillations of the measuring member.

A third type of damper for a weighing device is known from document U.S. Pat. No. 5,232,062, which functions based on the dynamics of liquid films of a reduced thickness. The container containing the liquid is also open here, and the plunger which is immersed therein has a lower surface which is planar and parallel to the bottom of the reservoir. Furthermore, the annular clearance between the reservoir and the plunger is wide and does not restrict substantially the flow of liquid during the oscillations of the measurement device to which the plunger is affixed.

In this type of damper, the damping force is very high and is proportional to the square of the surface of the plunger and inversely proportional to the distance between the plunger and the bottom of the container.

In this type of damper, the force is so important that the movement is damped in one or two oscillations only. However, owing to the properties of thin films, a residual force remains acting on the plunger, which is detrimental to the accuracy of the measurement. Furthermore, such dampers can only be used in weighing devices wherein the amplitude of the oscillations of the measuring element is very small owing to the small distance of the plunger from the bottom of the container.

The object of the present invention is a damper for weighing devices which obviates the above-mentioned shortcomings of existing devices. This invention is furthermore aimed at providing a damper for a weighing device which can be readily transported, which is not bulky, wherein the damping force is not determined by the physical properties of thin liquid films, which does not produce any alteration in the accuracy of the measurement and wherein a component of the damping force is a function of the weight to be measured, in such a manner as to optimise the damping time, whatever may be the weight measured.

Accordingly, the object of the invention is a damper for weighing devices including a cavity in which a plate can move, which plate is designed for being connected to a weight measuring device, characterised in that the cavity is closed tightly by a flexible membrane; in that this cavity is partly filled with an oil, while leaving a volume of air or of a gas between the top of the oil and the membrane, the plate being totally immersed in the oil; in that the lower surface of the plate and the bottom of the cavity have shapes which are not planar and which are not parallel to each other, thus preventing the formation of a thin film of oil between them; in that the peripheral surface of the plate and of the peripheral wall of the cavity define therebetween a first constriction of which the transverse section is constant whatever the position of the plate in the cavity; and in that the peripheral area of the bottom of the cavity and the peripheral area of the lower surface of the plate facing the bottom of the cavity, define together a second constriction of which the transverse section varies depending on the position of the plate inside the cavity.

The lower surface of the plate can have a shape which is curved and concave, with a peripheral rim.

The bottom of the cavity can exhibit a planar annular area, a protruding annular median area and a central concave area. The upper face of the cavity 4 can be tightly closed by a cover exhibiting a central passage providing access to a connector member connecting the plate to the free end of the deformable rod and the periphery of the flexible membrane can be clamped between the cover and the upper edge of the cavity, the central area of this membrane being clamped between the plate and the connector member.

The invention is also concerned with a weighing device including a frame, a sensor provided as a deformable monolithic rod, of which one end is affixed to the frame while the other end receiving the load to be weighed is fastened to the plate of a hydraulic damper movable within a cavity, characterised in that this cavity is provided in the frame and in that it is tightly closed by a flexible membrane; that this cavity is partly filled with an oil leaving a volume of air or of a gas between the top of the oil and the membrane, the plate being totally immersed in the oil; in that the lower surface of the plate and the bottom of the cavity have shapes which are not planar and which are not parallel to each other, thus preventing the formation of a thin film of oil between them; in that the peripheral surface of the plate and of the peripheral wall of the cavity define therebetween a first constriction of which the transverse section is constant whatever the position of the plate in the cavity; and in that the peripheral area of the bottom of the cavity and the peripheral area of the lower surface of the plate facing the bottom of the cavity define together a second constriction of which the transverse section varies depending on the position of the plate inside the cavity.

The upper face of the cavity can be closed by a cover having a central passage giving access to a connector member connecting the plate to the free end of the deformable rod and the periphery of the flexible membrane can be clamped between the cover and the upper edge of the cavity, the central area of this membrane being clamped between the plate and the connector member.

The appended drawing illustrates schematically and by way of example an embodiment of the weighing device and of the damper according to the invention.

FIG. 2 is a view at an enlarged scale and in cross-section of the damper for a weighing device.

Figure 1:
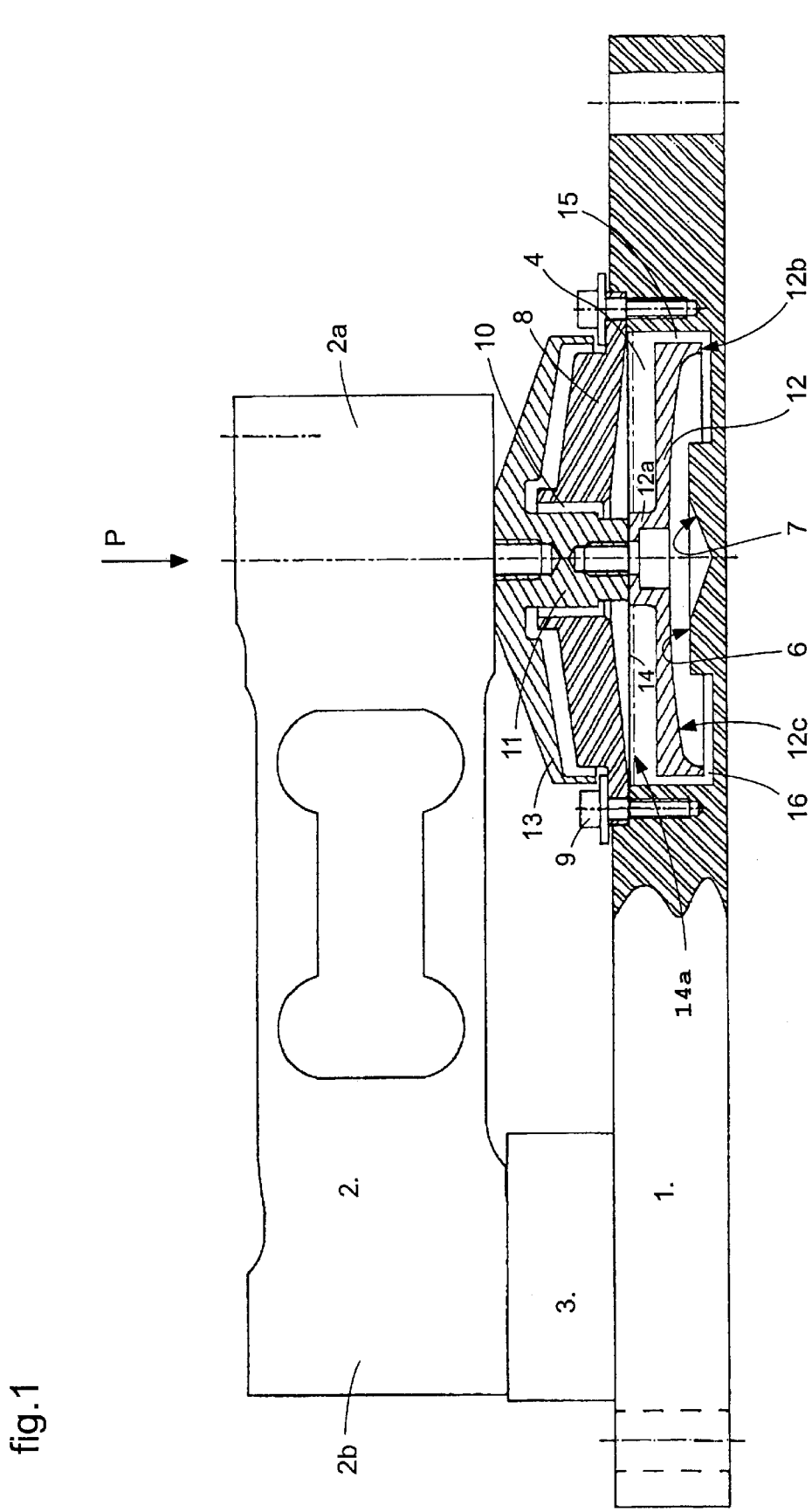
FIG. 1 is an overall view of the weighing device, partly in cross-section.

The weighing device illustrated in FIG. 1 includes a base plate 1 and a sensor 2 provided as a deformable single-bloc rod.

This deformable rod includes, in a known manner, strain gauges opposite its deformation hinges, to measure the deviation of the rod, which is dependent upon the weight P applied on its free end 2a. The deviation measured is directly proportional to the weight P. The other end 2b of the rod 2 is fastened rigidly via a support 3 to the base plate 1. This fastening can be achieved by tightening screws (not illustrated).

The base plate 1 includes, under the free end 2a of the rod 2, a cavity 4, preferably of a circular shape with a bottom including two annular areas 5, 6 situated in different planes, which are parallel in the example illustrated, but at different distances from the upper face of the base plate 1. The central part of the bottom of the cavity 4 has conical concave shape 7. This cavity 4 further includes an upper shoulder for receiving a cover 8 fastened to the base plate via screws 9.

The cover 8 has a central hole 10 providing a passage for the central shaft 11 of a connector member connecting the lower face of the free end 2a of the rod to a plunger 12 located in the cavity 4. The connector member further includes a skirt 13 for preventing dust or other particles from entering into the upper part of the cavity 4. A tight flexible membrane 14 is clamped at its periphery between the cover 8 and the base plate 1 and at its centre between the plunger 12 and the shaft 11 of the connector member. In this manner, there is formed a sealed chamber in the cavity 4, which sealed chamber is filled with a liquid, generally oil. The level 14a to which the oil is filled does not reach the membrane, and, accordingly, an air or a gas pocket is provided in the sealed chamber, thus avoiding that the characteristics of the damper be dependent upon the atmospheric pressure.

The plunger 12 includes a small hub 12a making possible its fastening to the connector member 11, for instance by means of a screw. The plunger includes a plate which is entirely immersed in the oil and which has generally the shape of a bell. The lower surface of this plate includes an annular peripheral area 12b which is planar and parallel to the peripheral annular area 5 of the bottom of the cavity 4. In an alternate version, this peripheral area 12a of the plate could be other than planar. It can be rounded, grooved or have any other configuration. The remainder of the lower surface 12c of this plate has the shape of a dome having a radius of curvature which is greater at the centre than in the peripheral area. The shape of the bottom of the cavity 4 and that of the lower surface of the plate 12 are such that they are not parallel and that no liquid film may form between them, thus avoiding any undesirable effect, such as the plate <<sticking>> to the bottom of the cavity.

This damper further exhibits the characteristic feature of having two damping areas provided as constrictions for the liquid, one 15 between the side wall of the cavity 4 and the peripheral wall of the plate and the other 16 between the annular peripheral area 5 of the bottom of the cavity and the annular peripheral area 12b of the lower surface of the plate 12.

The damping force due to the peripheral constriction 15 remains constant, whatever may be the amplitude of the motion of the plate 12 inside the cavity 4. On the other hand, the damping force due to the constriction 16 between the lower peripheral edge of the plate and the bottom of the cavity increases with the amplitude of the movements of the plate in the direction of the bottom of the cavity. Accordingly, the greater the weight to be measured, the greater this component of the damping force.

Owing to the non linear variation of the damping force versus the weight of the object being weighed, it is possible to optimise the damping time of the oscillations of the deformable rod 2, whatever may be the value of the load, within however a certain range which is dependent upon the characteristics of the deformable rod.

Owing to the shape of the bottom of the cavity 4 and of the lower face of the plate 12, all the undesirable effects of a thin film are eliminated, since such a film cannot form between these components.

In the example illustrated, the cavity 4 of the damper is provided in the base plate 1 or frame, but in other versions, the housing of the damper could be distinct from this frame.

The main characteristics of the damper according to the invention are:

1. That the cavity of the damper is closed in a sealed manner, which allows the damper to be transported and handled without any problem.
2. That the cavity of the damper is closed by means of a flexible membrane and that the oil does not fill completely this sealed cavity, which avoids that changes in the atmospheric pressure influence the functioning characteristics of the damper.
3. That the shape of the inner surface of the plate 12 and that of the bottom of the cavity 4 be such that they prevent the formation of thin films of oil between these two components, to avoid an excessive damping force and the <<sticking>> of these surfaces due to the physical characteristic of the thin films, which sticking would prevent the measuring rod from stabilising in the equilibrium position and would have an adverse effect on the accuracy of the measurement.

In particular, one must take care that the surfaces of the bottom and of the plate are not parallel and that a certain volume of oil remains therebetween, which is of a variable thickness.

4. That the damper includes a first annular constriction 15 around the peripheral wall of the plate of the plate 12, thus providing a damping force which is constant.
5. That the damper includes a second constriction 16 between the bottom of the cavity and an annular peripheral area 12b of the lower surface of the plate 12, thus providing a damping force which varies as a function of the weight of the load being weighed.

Furthermore, the higher the weight of the load, the greater the amplitude of the displacement of the rod and hence the greater the amplitude of the movement of the plate 12 in the direction of the bottom of the cavity 4, which results in the crosssection of the constriction decreasing and thus opposing an increased resistance to the flow of the oil.

In this manner, an optimum damping is achieved which is dependent upon time required for reaching equilibrium and hence for carrying out the measurement. Clearly, in alternate versions, the bottom of the cavity 4 and the lower face of the plate 12 facing the bottom of the cavity 4 may be different from those illustrated in the drawing. One must however ensure that shapes of these surfaces define a constriction wherein the cross-section between the plate and the bottom varies and that the formation of a thin oil film is impossible between these two surfaces. To this end, it generally suffices that these surfaces be other than planar and parallel and that they define between them a volume of oil of a thickness which is variable and which is not constant.

What is claimed is:

1. A damper for a weighing device including a cavity (4) in which a plate (12) is movable, which plate is designed for being connected to a weight measuring device (2), characterised in that the cavity (4) is closed tightly by a flexible membrane (14); in that this cavity (4) is partly filled with an oil, while leaving a volume of air or of a gas between the top (14a) of the oil and the membrane, the plate (12) being totally immersed in the oil; in that the lower surface of the plate (12) and the bottom of the cavity (4) have shapes which are not planar and which are not parallel to each other, thus preventing the formation of a thin film of oil between them; in that the peripheral surface of the plate (12) and of the peripheral wall of the cavity (4) define therebetween a first constriction (15) of which the transverse section is constant whatever the position of the plate (12) in the cavity (4); and in that the peripheral area (5) of the bottom of the cavity (4) and the peripheral area (12b) of the lower surface of the plate (12) facing the bottom of the cavity (4), define together a second constriction (16) of which the transverse section varies depending on the position of the plate (12) inside the cavity (4).

2. A damper according to claim 1, characterised in that the lower surface of the plate exhibit a curved concave shape (12c) provided with a peripheral rim (12b).

3. A damper according to claim 1, characterised in that the bottom of the cavity exhibits an annular area (5) which is planar, a protruding annular median area (6) and a central concave area (7).

4. A damper according to claim 1 characterised in that the upper face of the cavity (4) is closed by a cover (8) exhibiting a central passage (10) providing access to a connector member (11) connecting the plate (12) to the free end (2a) of the deformable rod (2) and in that the periphery of the flexible membrane (14) is clamped between the cover (8) and the upper edge of the cavity (4) the central area of this membrane (14) being clamped between the plate (12) and the connector member (11).

5. A weighing device including a frame, a sensor provided as a deformable monolithic rod (2), of which one end (2b) is affixed to the frame (1) while the other end (2a) receiving the load (P) to be weighed is fastened to the plate (12) of a hydraulic damper movable within a cavity (4), characterised in that this cavity (4) is provided in the frame (1) and in that it is tightly closed by a flexible membrane (14); that this cavity (4) is partly filled with an oil leaving a volume of air or of a gas between the top (14a) of the oil and the membrane (14), the plate (12) being totally immersed in the oil; in that the lower surface (12b, 12c) of the plate (12) and the bottom (5, 6, 7) of the cavity (4) have shapes which are not planar and which are not parallel to each other, thus preventing the formation of a thin film of oil between them; in that the peripheral surface of the plate (12) and of the peripheral wall of the cavity (4) define therebetween a first constriction (15) of which the transverse section is constant whatever the position of the plate (12) in the cavity (4); and in that the peripheral area (5) of the bottom of the cavity (4) and the peripheral area (12b) of the lower surface of the plate (12) facing the bottom of the cavity (4) define together a second constriction (16) of which the transverse section varies depending on the position of the plate (12) inside the cavity (4).

6. A weighing device according to claim 5, characterised in that the upper face of the cavity (4) is closed by a cover (8) having a central passage (10) giving access to a connector member (11) connecting the plate (12) to the free end (2a) of the deformable rod (2) and in that the periphery of the flexible membrane (14) is clamped between the cover (8) and the upper edge of the cavity (4), the central area of this membrane (14) being clamped between the plate (12) and the connector member (11).

7. A damper according to claim 1, the lower face of the plate (12) facing the bottom of the cavity (4) having an annular rim (12b).

8. A weighing device according to claim 5, the lower face of the plate (12) facing the bottom of the cavity (4) having an annular rim (12b).

* * * * *